United States Patent [19]

Smolenski et al.

[11] Patent Number: 5,019,952
[45] Date of Patent: May 28, 1991

[54] AC TO DC POWER CONVERSION CIRCUIT WITH LOW HARMONIC DISTORTION

[75] Inventors: Joseph L. Smolenski, Pittsfield; Gerard W. Christopher, Dalton; John C. Wright; Alfred E. Relation, both of Pittsfield, all of Mass.

[73] Assignee: General Electric Company, Pittsfield, Mass.

[21] Appl. No.: 439,319

[22] Filed: Nov. 20, 1989

[51] Int. Cl.[5] ............... H02M 3/335; G05F 1/56
[52] U.S. Cl. ............... 363/16; 363/79; 363/80; 363/124; 323/222; 323/275; 323/285
[58] Field of Search ............... 363/16, 74, 78, 79, 363/80, 89, 95, 97, 98, 124, 131; 323/222, 223, 259, 265, 273, 275, 282, 284, 299, 349, 351, 285

[56] References Cited

U.S. PATENT DOCUMENTS

| | | |
|---|---|---|
| 4,245,285 | 1/1981 | Weiss . |
| 4,245,286 | 1/1981 | Paulkovich et al. . |
| 4,384,321 | 5/1983 | Rippel . |
| 4,412,277 | 10/1983 | Mitchell . |
| 4,437,146 | 3/1984 | Carpenter . |
| 4,467,268 | 8/1984 | Chambers et al. . |
| 4,481,460 | 11/1984 | Kroning et al. . |
| 4,504,896 | 3/1985 | Easter et al. . |
| 4,533,986 | 8/1985 | Jones . |
| 4,542,451 | 9/1985 | Hucker . |
| 4,562,383 | 12/1985 | Kerscher et al. . |
| 4,677,366 | 6/1987 | Wilkinson et al. ............... 363/89 X |
| 4,761,722 | 8/1988 | Pruitt ............... 323/222 X |

Primary Examiner—Robert Skudy
Assistant Examiner—Emanuel Todd Voeltz
Attorney, Agent, or Firm—Bailin L. Kuch; Robert A. Cahill

[57] ABSTRACT

In an AC to DC power conversion circuit including a boost inductor connected in series between a full-wave rectifier and a DC load, a switch is connected to selectively shunt boost inductor current from the load. Switch conduction is controlled by a pulse width modulator generating switching pulses at a high fixed frequency. The pulse widths are automatically varied as a function of boost inductor current, load voltage, and an ideal sinusoidal waveform derived from the AC input voltage to force the boost inductor current to closely conform to the ideal sinusoidal waveform and thus minimize harmonic distortion, while achieving load voltage regulation and near unity power factor.

11 Claims, 6 Drawing Sheets

AC TO DC POWER CONVERSION CIRCUIT WITH LOW HARMONIC DISTORTION

The present invention relates in general to power conversion circuits and more specifically to a circuit for converting AC power to DC power while imparting minimal harmonic distortion to the current flowing into the conversion circuit.

BACKGROUND OF THE INVENTION

Known circuits for converting AC power to DC power, such as rectifier networks with passive input and output filters, produce significant harmonic distortion of the AC current waveforms. Harmonic distortion causes undesirable power dissipation and creates unwanted electromagnetic interference which couples into other lines and equipment. Distorted AC current waveforms also excite undesirable vibrational modes in electromagnetic couplings. In addition, input power factor is adversely affected resulting in decreased operating efficiency.

Still other known AC to DC power conversion approaches involve active circuits utilizing various pulse width modulated switching mode techniques. Such pulse width modulation techniques produce discrete circuit current pulses at the modulation frequency which require substantial filtering to limit harmonic distortion and electromagnetic interference. Substantial filtering adds to the weight of the conversion circuit, requires additional space, increases costs, and makes it difficult to achieve near unity power factor.

OBJECTS OF THE INVENTION

It is therefore an object of the present invention to provide an improved power conversion circuit for converting single phase or polyphase AC input power to DC output power which overcomes the foregoing shortcomings and disadvantages of known power conversion circuits.

An additional object of the present invention is to provide an AC to DC power conversion circuit of the above-character, wherein harmonic distortion of the circuit current is minimized.

Yet another object of the present invention is to provide a power conversion circuit of the above-character, which automatically provides for regulation of the output DC load voltage.

Still another object of the present invention is to provide a power conversion circuit of the above-character, wherein near unity power factor is achieved.

A further object of the present invention is to provide a power conversion circuit of the above-character, wherein less input electromagnetic interference filtering is required.

A still further object is to provide a power conversion circuit of the above-character, which is efficient in construction and operation and reliable over a long service life.

Other objects of the invention will in part be obvious and in part appear hereinafter.

SUMMARY OF THE INVENTION

In accordance with the present invention there is provided an improved power conversion circuit which finds application in the conversion of AC input power to DC output power for application to a load. The power conversion circuit includes a single phase bridge rectifier which supplies full-wave rectified AC current to a DC load through a boost inductor and a diode. A filter capacitor is connected across the DC load. A current shunting switch is connected in series with the inductor across the bridge rectifier and in parallel with the series combination of a blocking diode and the composite load impedance.

The power conversion circuit further includes a control unit containing a pulse width modulator for controlling the conducting time period of the current shunting switch. The pulse width modulator issues commutating pulses to the shunting switch at a fixed high frequency, relative to the AC input frequency, whose widths are continuously varied as a function of the relationship of the boost inductor full-wave current waveform to an ideal full-wave rectified sinusoidal waveform which is continuously compensated for variations in input AC voltage and DC load voltage. More specifically, the pulse widths are varied to accordingly vary the closure time of the shunting switch during each fixed pulse cycle of period. Thus, the switch is closed at the beginning of each pulse period and is opened when the boost inductor current rises to the instantaneous level of the ideal current waveform. The boost inductor current waveform is thus periodically adjusted so as to closely conform to the ideal sinusoidal waveform. Harmonic distortion of the conversion circuit current is thus minimized while concurrently regulating the load voltage and controlling the phase relationship between the boost inductor circuit current and the input voltage to near unity power factor.

BRIEF DESCRIPTION OF THE DRAWINGS

These and other objects of the present invention together with further features and advantages thereof, will become apparent from the following detailed description when read together with the accompanying drawings, in which.

Like reference numerals refer to corresponding parts throughout the several views of the drawings.

DETAILED DESCRIPTION OF THE INVENTION

Figure 1:
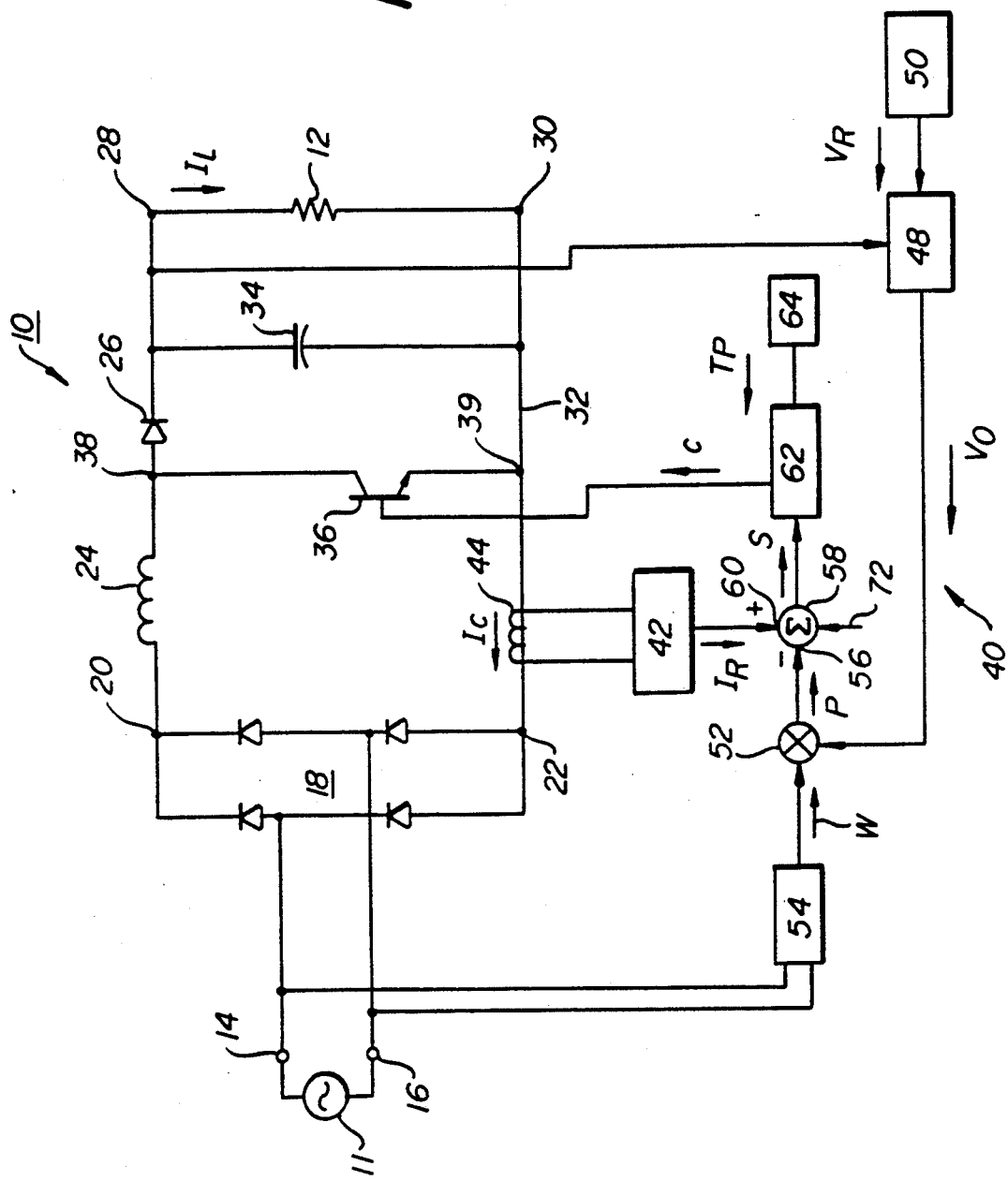
FIG. 1 is a schematic diagram of a single phase power conversion circuit constructed in accordance with an embodiment of the present invention.

Referring to FIG. 1, the single phase power conversion circuit of the present invention, generally indicated at 10, is illustrated in its application of converting the AC input power of a source 11 to DC output for power for application to a load 12. Conversion circuit 10 includes AC power input terminals 14 and 16 which are connected to a diode bridge rectifier net work, generally indicated at 18, for developing a full-wave rectified AC voltage across rectifier output terminals 20 and 22. A boost inductor 24 and a diode 26 are connected in series between rectifier output terminal 20 and a first DC load terminal 28 of conversion circuit 10. A second DC load terminal 30 is directly connected to rectifier output terminal 22 via lead 32.

The inductance of inductor 24 is selected to allow a rate of change of full-wave rectified AC current greater than the anticipated maximum rate of change of AC input current. A DC filter capacitor 34 is connected across load terminals 28 and 30. A switch 36, shown as a transistor, is connected from junction 38 between inductor 24 and diode 26 to a junction 39 with lead 32.

A current control unit, generally indicated at 40, controls the conducting time interval of switch 36 and includes a current sense circuit 42 for generating a signal $I_R$ representative of boost inductor or circuit current $I_C$ flowing in lead 32 between junction 39 and the input bridge rectifier output terminal 22. Current sense circuit 42 includes a DC current transformer 44 coupled with lead 32 for deriving signal $I_R$. Alternatively, this signal can be derived from the voltage drop occasioned by the flow of circuit current through a precision resistor or current shunt.

Control unit 40 further includes a voltage sense circuit for deriving a signal $V_o$ representative of the DC load voltage appearing across load terminals 28 and 30. This voltage sense circuit includes a comparator and compensation network 48 for comparing the DC load voltage to a DC reference voltage $V_R$ developed by a source 50. The magnitude of voltage signal $V_o$ at the output of comparator 48 is thus a function of the difference between the voltage across load 12 and DC voltage reference $V_R$ and is applied as one input to a multiplier circuit 52.

An AC reference waveform circuit 54 generates a distortion-free, full-wave rectified sinusoidal AC reference waveform signal W representative of the AC input voltage waveform of source 11. Circuit 54, generally a precision full-wave bridge rectifier circuit or a phase locked signal generator, is connected across input terminals 14 and 16 in parallel with bridge rectifier network 18. This ideal waveform signal W is applied as the other input to multiplier circuit 52.

Output signal P of multiplier circuit 52, the product of voltage sense signal $V_o$ and reference waveform signal W, is applied to the negative input 56 of a summation circuit 58. It is seen that the multiplier output signal P is an ideal, full-wave rectified, sinusoidal waveform which is compensated for magnitude variations in both the AC input voltage and the DC load voltage. The positive input 60 of the summation circuit receives current signal $I_R$ from current sense circuit 42. Output signal S of summation circuit 58 therefore is a signal which varies as a function of the difference between the magnitudes of the actual circuit current $I_C$ and the compensated ideal sinusoidal waveform, signal P. Signal P, shown in FIG. 2, thus represents a full-wave rectified sinusoidal waveform to which circuit current $I_C$ must be made to adhere to as closely as possible to minimize its harmonic distortion as the load voltage is being regulated to a desired level. Since signal P is in phase with the AC input voltage, adherence of the current $I_C$ thereto also achieves a desirable near unity power factor. Signal S is applied to a pulse width modulator (PWM) 62, whose output pulse signal C, in turn, is applied to control the conduction time interval of switch 36. The period of each pulse signal C is fixed by a clock pulse generator 64 issuing timing pulses TP at a constant frequency significantly in excess of the AC source frequency.

Figure 2:
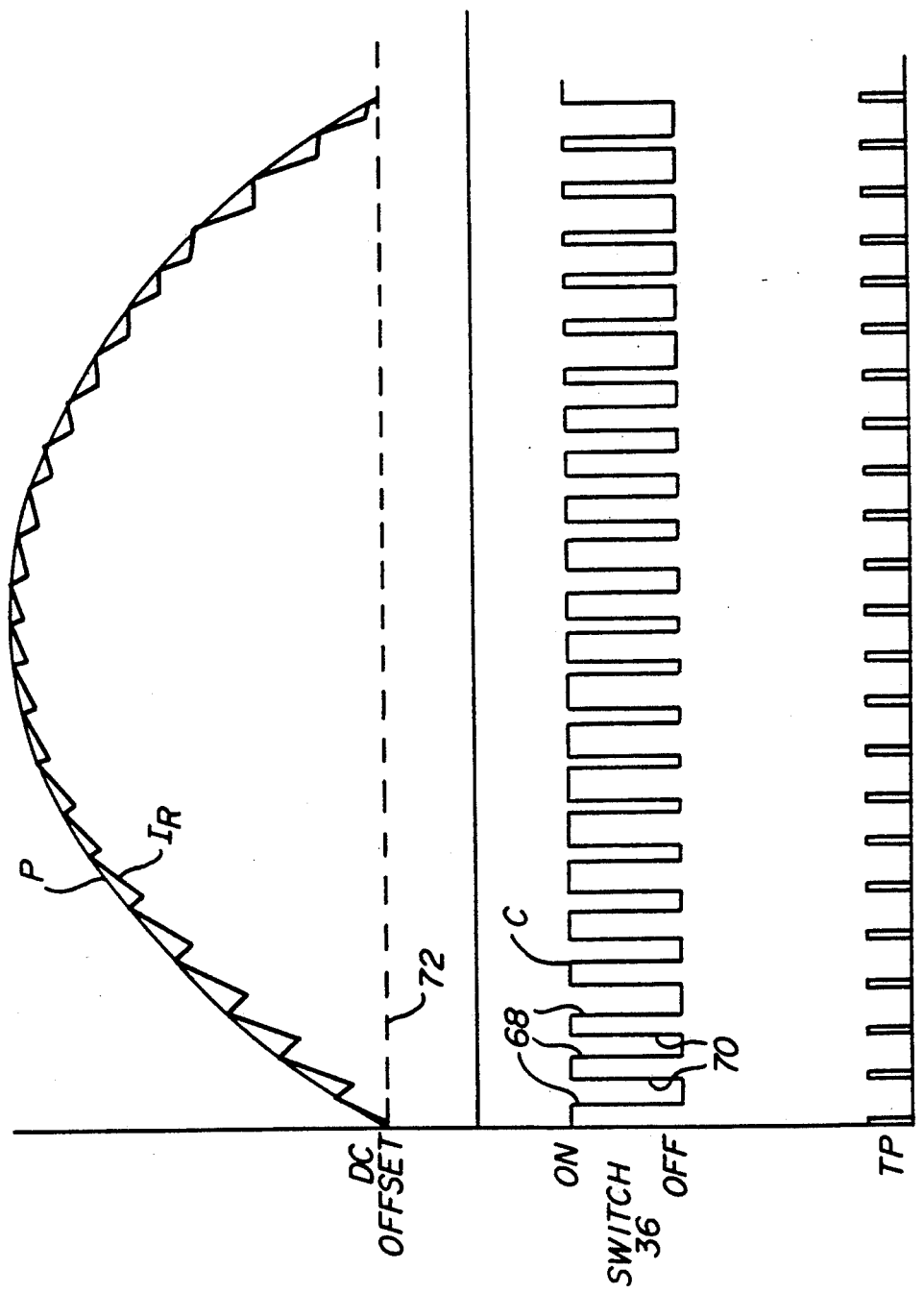
FIG. 2 is a timing diagram illustrating the operation of power conversion circuit of FIG. 1.

In accordance with the present invention, switch 36 is controlled in a novel manner to more precisely achieve these goals. As seen in FIG. 1, when the amplitude of circuit current $I_C$, represented by signal $I_R$, is below the amplitude of signal P, signal S has a negative polarity, and PWM 62 maintains switch 36 in the conduction state until signal S changes polarity. With conversion circuit 10 in its steady-state operating condition, as the full-wave rectified AC voltage across rectifier output terminals 20 and 22 rises from zero, very little if any current exists in boost inductor 24. The voltage across capacitor 34 is greater than the peak voltage of the input AC voltage, and PWM 62 holds switch 36 closed to increase the boost inductor 24 current. As the current in boost inductor 24 is increasing, capacitor 34 discharges to provide load current $I_L$ to load 12. Current sense circuit 42 generates signal $I_R$ which is representative of the boost inductor current $I_C$. Specifically, as seen in FIG. 2, the PWM applies control signal C pulse to hold switch 36 in conduction, and the current in inductor 24 continues to increase and consequently the amplitude of circuit current signal $I_R$ rises. However, when the magnitude of circuit current signal $I_R$ rises just above the amplitude of signal P waveform, the polarity of signal S goes positive. This condition signals PWM 62 to terminate its signal pulse C, as indicated at 68 in FIG. 2, and switch 36 is turned off. Boost inductor 24 current now flows through diode 26 to supply current to load 12 and charging current to capacitor 34.

The summation of the load current and capacitor charging current now constitutes the circuit current $I_C$ sensed by circuit 42 which is reflected in signal $I_R$. As the energy in boost inductor 24 decreases, so does the circuit current signal $I_R$ which quickly drops below the instantaneous level of ideal reference waveform signal P. The polarity of signal S goes negative. However, PWM 62 does not issue its next switch commutating pulse C until triggered by the next timing pulse TP issued by clock pulse generator 64. Thus, as seen in FIG. 2, switch 36 is rendered conductive in response to each timing pulse TP, as indicated at 70, and, in the interval between each timing pulse, is rendered nonconductive when circuit current signal $I_R$ rises to slightly in excess of ideal waveform signal P. The switch conduction interval is therefore seen to have a variable time period determined by the timing pulse frequency, the input voltage and the output load voltage. This switch on/off cycling is repeated throughout each full-wave rectified, half-cycle of the circuit current to achieve close conformance thereof to an ideal sinusoidal waveform and thus to minimize harmonic distortion.

It will be appreciated that the higher the switch commutating rate, the better the conformity of the circuit current to the ideal sinusoidal waveform. Thus, higher modulation rates afford superior results. High modulation rates are also advantageous from the standpoint of minimizing input electromagnetic interference filtering requirements since the amplitude of the high frequency current components are a small percentage of the low frequency fundamental input current.

To overcome the inability of forcing the circuit current $I_C$ to adhere to an ideal full-wave rectified sinusoidal waveform P near the zero intersections between positive half cycles when the input AC voltage is near zero and thus insufficient to force current in boost inductor 24 to increase, a DC offset voltage, indicated at 72 in FIGS. 1 and 2, is additively introduced to summation circuit 58. This offset effectively prevents the boost inductor current, i.e., circuit current $I_C$, from going to zero as the AC input voltage crosses zero. This offset effectively minimize low frequency harmonic distortion. Bridge rectifier 18 unfolds this DC offset, and thus it has no effect on AC input power.

Figure 3:
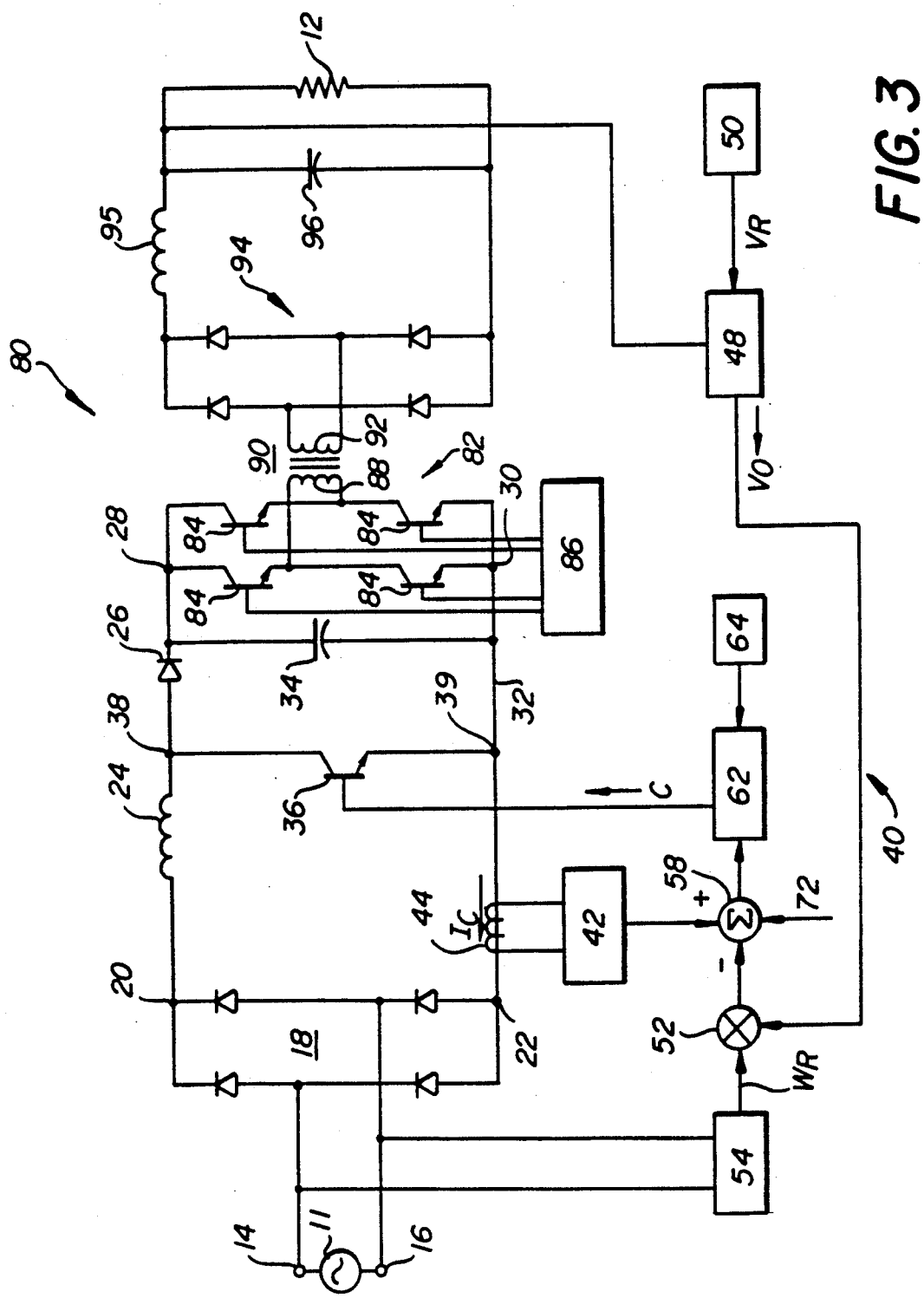
FIG. 3 is a schematic diagram of a single phase power conversion circuit constructed in accordance with a further embodiment of the present invention.

In the embodiment of the invention seen in FIG. 3, generally indicated at 80, the DC voltage developed across terminals 28 and 30 is converted to a high frequency AC voltage by an inverter, generally indicated at 82, whose switching transistors 84 are switched by a control circuit 86 to alternatively drive current in opposite directions through the primary winding 88 of an isolation transformer 90. The high frequency AC voltage on the secondary winding 92 is full-wave rectified by a bridge rectifier 94 and applied across DC load 12 through a series inductor 95. A filter capacitor 96 is connected across the DC load. The comparator signal $V_o$, representative of deviations of the DC load voltage from the reference voltage $V_R$, is fed back to multiplier 52 to voltage-compensate the waveform signal $W_R$.

Power conversion circuit 80 of FIG. 3 operates in the manner described above for circuit 10 of FIG. 1 to control switch 36 such as to minimize harmonic distortion of circuit current $I_C$. A particular advantage of power conversion circuit 80 is the AC input to DC output isolation afforded by transformer 90. Since inverter 82 can operate at a high frequency relative to the AC source frequency, this isolation transformer can be considerably smaller than would be required of one (not shown) connected between AC source 11 and diode bridge 18 in FIG. 1.

Figure 5:
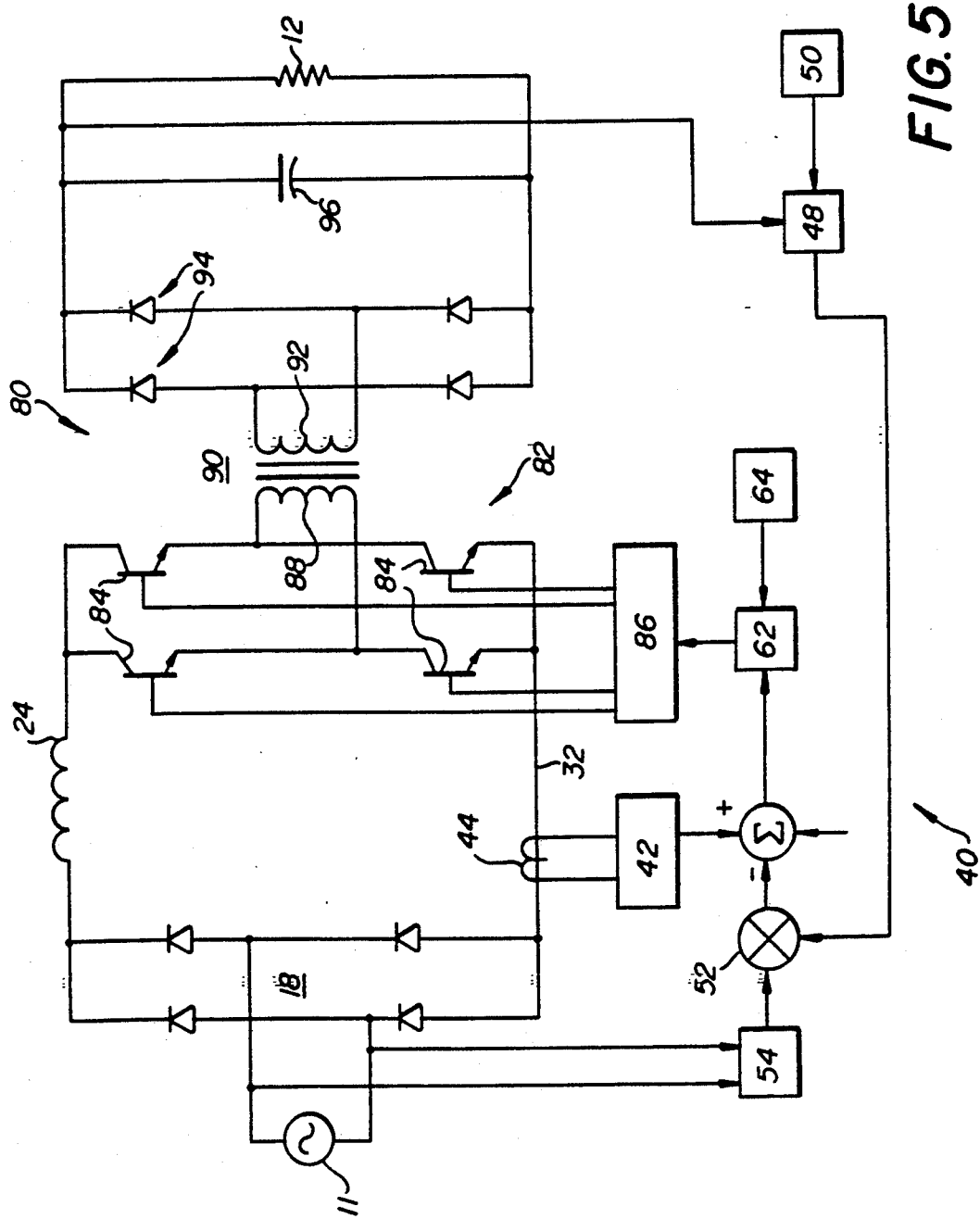
FIG. 5 is a schematic diagram of a single phase power conversion circuit constructed in accordance with another embodiment of the present invention.

It will be appreciated that power conversion circuit 80 of FIG. 3, which utilizes a voltage fed bridge inverter, may be modified to provide a current fed bridge inverter as seen in FIG. 5. In this configuration, pulse width modulator pulses of PWM 62 are used to control the operation of inverter control circuit 86. The inverter 82 would then operate with the conduction times of inverter switches 84 overlapping to achieve the same modulated current shunting action of switch 36. Consequently, the inverter would perform the dual functions of chopping the DC voltage across terminals 28, 30 to generate an AC voltage and of controllably conforming the circuit current IC to an essentially ideal, full-wave sinusoidal waveform.

The power conversion circuits of FIGS. 1 and 3 are, as described above, well suited to convert AC input power to DC output power with minimal harmonic distortion on an steady-state basis. However, problems can be encountered during startup or under load overcurrent conditions. During startup, load voltage is zero, and consequently the inrush circuit current can exceed the surge current rating of boost inductor 24 and filter capacitor 34. Regardless of the state of switch 36, inductor current can uncontrollably rise to potentially destructive levels. The same consequence can occur if an overload or a short is imposed across output terminals 28, 30. The DC output voltage then drops below the AC input voltage, and control of boost inductor current $I_C$ is lost.

Figure 4:
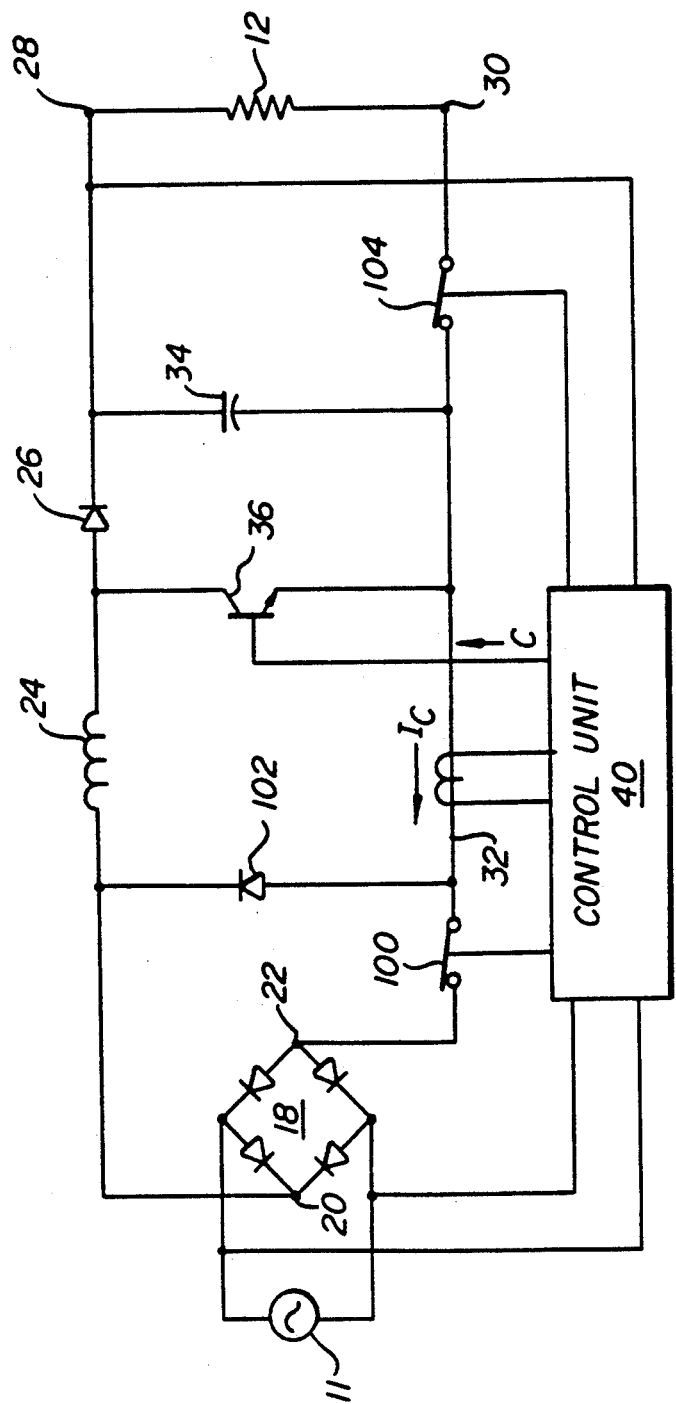
FIG. 4 is a simplified schematic diagram of the power conversion circuit of FIG. 1 illustrating additional features of the invention.

To safeguard against this problem of excessive, uncontrollable boost inductor current, the power conversion circuit of the present invention is equipped, as seen in FIG. 4, with a current limiting switch 100 for disconnecting lead 32 from output terminal 22 of diode bridge 18. This switch, illustrated as a mechanical switch, in practice would take the form of a high current solid-state switch, is opened by control unit 40 if the sensed boost inductor current $I_C$ exceeds a safe upper limit. With current limiting switch 100 open, boost inductor current is conducted by free-wheeling diode 102 when shunting switch 36 closes. Since AC source 11 is disconnected from the conversion circuit, the input voltage seen by boost inductor 24 is the drop across diode 102, which is virtually zero. The boost inductor current is thus reduced as energy is transferred to the load when switch 36 is opened. Switch 100 is reclosed, and the operation is repeated until the transient startup condition has subsided or the load over current condition is removed. The circuit current then remains at controllable levels consistent with steady state operation. It will be appreciated by those skilled in the art that current limiting switch 100 may be implemented in various forms elsewhere in the circuit, such as an AC switch in one side of the connections between AC source 11 and diode bridge 18 or as multiple switches in the diode bridge itself. In the latter case, the bridge diodes could be replaced with unidirectional switching devices normally controlled to perform well known synchronous rectification and further controlled to automatically disconnect the AC source in the event of a sensed uncontrollable circuit current condition.

FIG. 4 also discloses the inclusion of an additional switch 104 which is implemented to facilitate startup of the conversion circuit into a heavy DC load which could prevent filter capacitor 34 from being charged to a near steady state voltage. Thus, switch 104 is initially opened by control unit 40 until the filter capacitor is charged to an acceptable level and automatically closed to connect load 12 into the conversion circuit to begin steady-state operation.

It will be further appreciated by those skilled in the art that the conversion circuits of the present invention can be expanded to accommodate any polyphase AC source. Each separate conversion circuit is suitably modulated to cause each of the polyphase AC currents to conform to an ideal sinusoid, and all polyphase circuits are commonly controlled to regulate the load voltage.

Figure 6:
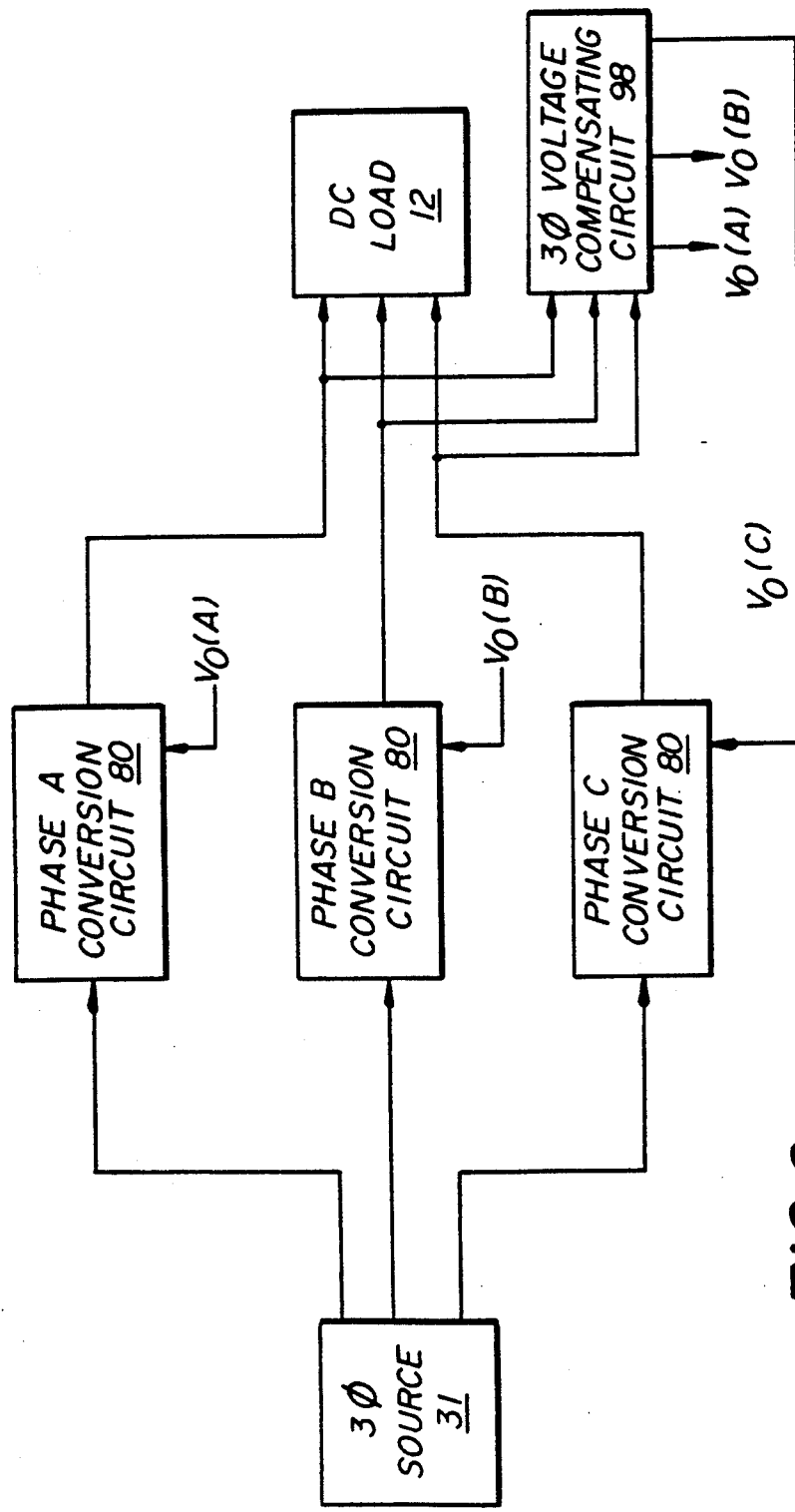
FIG. 6 is a simplified schematic diagram of the embodiment of FIG. 3 expanded to provide a polyphase power conversion circuit as yet another embodiment of the invention.

FIG. 6 illustrates an exemplary polyphase embodiment of the invention. A three-phase source 31 is applied to three power conversion circuits 80 as disclosed in FIG. 3. Each power circuit 80 is controlled by its own current control unit which is the same as current control unit 40 in FIG. 3 except for the omission of voltage reference 50 and voltage sense circuit 48. Instead, the three current control units are properly biased by signals $V_o(A)$, $V_o(B)$, $V_o(C)$ derived by a three phase voltage sense circuit 98 which includes a voltage reference source and a three-phase comparator and compensation network. The output terminals of the three power conversion circuits 80 output terminals are connected in parallel to provide DC voltage to load 12.

From the foregoing description, it is seen that the objects set forth above, including those made apparent from the preceding description, are efficiently attained, and, since certain changes may be made in the constructions set forth without departing from the scope of the invention, it is intended that all matters of detail be taken as illustrative and not in a limiting sense.

Having described the invention, what is claimed as new and desired to secure by Letter Patent is:

1. A power conversion circuit for converting AC input power to DC output power for application to a DC load connected across a pair of load terminals, said circuit comprising:
   a rectifier including an input for receiving AC input power and an output for developing a full-wave rectified AC voltage;
   a boost inductor and a diode connected in series between said rectifier output and one of said load terminals;
   a capacitor connected across said load terminals;
   switching means connected in series with said inductor across said rectifier output;
   current sensing means for generating a first signal representative of the circuit current flowing through said boost inductor;
   voltage sensing means for generating a second signal representative of a DC voltage appearing across said load terminals;
   first means connected to said rectifier input for generating a harmonic distortion-free waveform reference signal representative of an AC input voltage sinusoidal waveform;
   a multiplier for generating a third signal equal to the product of said second signal and said waveform reference signal;
   second means for generating a fourth signal representative of the relative magnitudes of said first and third signals;
   third means for generating a series of timing pulses at a fixed frequency; and
   a pulse width modulator responsive to said fourth signal and said timing pulses for closing said switching means with the occurrence of each said timing pulse and opening said switching means during each interval between consecutive timing pulses when said first signal rises to the magnitude of said third signal, whereby to force the circuit current flowing through said boost inductor into close amplitude conformity with the AC input voltage waveform.

2. The power conversion circuit in accordance with claim 1 wherein said fixed frequency of said timing pulses is in excess of the frequency of the AC input power.

3. The power conversion circuit in accordance with claim 2 wherein said second means is a summing circuit for subtractively combining said first and third signals to generate said fourth signal, said pulse width modulator opening said switching means in response to a change in polarity of said fourth signal.

4. The power conversion circuit in accordance with claim 1, which further includes current fed inverter having an input connected across said capacitor and an output, an isolation transformer having a primary winding connected to said inverter output and a secondary winding, and a full-wave bridge rectifier connecting said secondary winding to said load terminals.

5. The power conversion circuit defined in claim 4, which further includes an output inductor connected in circuit between said secondary winding and said load terminals, and an output capacitor connected across said load terminals.

6. The power conversion circuit in accordance with claim 3, wherein a DC offset signal is additively combined with said first and third signals in said summing circuit.

7. The power conversion circuit in accordance with claim 3, which includes current limiting switching means and a free-wheeling diode connected across said rectifier output, said current limiting switching means operating to automatically remove said full-wave rectified AC voltage from said boost inductor in response to excessive magnitudes of boost inductor current.

8. The power conversion circuit in accordance with claim 3, which further includes startup switching means connected between said capacitor and one of said load terminals, said startup switching means being held open until said capacitor is charged to a voltage level sufficient for steady-state circuit operating.

9. The power conversion circuit in accordance with claim 8, wherein a DC offset signal is additively combined with said first and third signals in said summing circuit.

10. The power conversion circuit in accordance with claim 9, which includes current limiting switching means and a free-wheeling diode connected across said rectifier output, said current limiting switching means operating to automatically remove said full-wave rectified AC voltage from said boost inductor in response to excessive magnitudes of boost inductor current.

11. A polyphase power conversion circuit for converting AC input power from a polyphase source to DC output power for application to a DC load, said circuit comprising:
   A. a plurality of separate conversion circuits having respective pairs of output terminals connected with the DC load, each including:
   a rectifier having an input connected with a different phase of the polyphase source and an output for developing a full-wave rectified AC voltage,
   a boost inductor and a diode connected in series between said rectifier output and one of said output terminals,
   a capacitor connected across said output terminals,
   switching means connected in series with said inductor across said rectifier output,
   current sensing means for generating a first signal representative of the circuit current flowing through said boost inductor,
   first means connected to said rectifier input for generating a harmonic distortion-free waveform reference signal representative of an AC input voltage sinusoidal waveform,
   a multiplier for generating a second signal equal to the product of said waveform reference signal and a third signal,
   second means for generating a fourth signal representative of the relative magnitudes of said first and second signals,
   third means for generating a series of timing pulses at a fixed frequency, and
   a pulse width modulator responsive to said fourth signal and said timing pulses for closing said switching means with the occurrence of each said timing pulse and opening said switching means during each interval between consecutive timing pulses when said first signal rises to the magnitude of said second signal, whereby to force the circuit current flowing through said boost inductor into close amplitude conformity with the AC input voltage waveform; and
   B. a polyphase voltage sense circuit connected with said output terminals of each said conversion circuit for deriving separate said third signals for respective application to said multipliers of said conversion circuits.

* * * * *